July 21, 1931.  W. SCHAAKE  1,815,591
TROLLEY POLE
Filed April 4, 1930
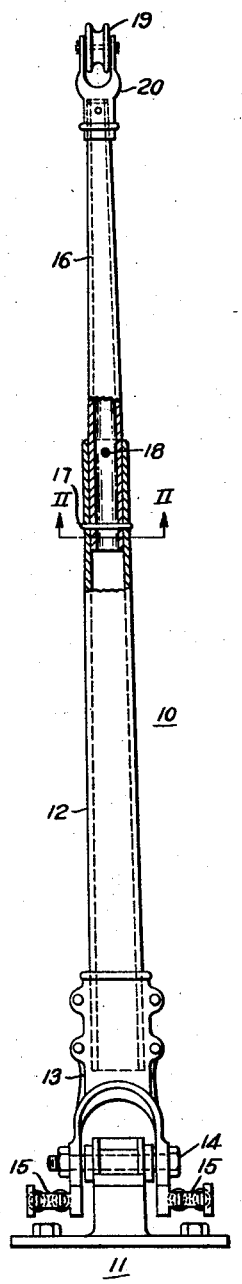
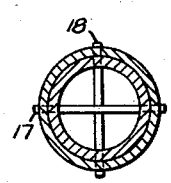
INVENTOR
William Schaake.
BY
ATTORNEY.

Patented July 21, 1931

1,815,591

UNITED STATES PATENT OFFICE

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA

TROLLEY POLE

Application filed April 4, 1930. Serial No. 441,537.

My invention relates to trolley poles for electrically propelled vehicles.

An object of my invention, generally stated, is to provide a trolley pole that shall be simple and efficient in service and which may be readily and economically manufactured.

A more specific object of my invention is to provide a trolley pole that shall be light in weight.

Another object of my invention is to provide a trolley pole in which the deflection caused by the pressure exerted against the trolley conductor shall be small.

Still another object of my invention is to provide a trolley pole which will require a small amount of spring tension to maintain the necessary contact pressure between the current collector and the trolley conductor.

It is the usual practice to construct a trolley pole of a single piece of steel tubing which is gradually tapered toward the end on which the trolley wheel is mounted. Steel has been used, primarily, on account of its high modulus of elasticity, as compared with other materials. The modulus of elasticity is a measure of the stiffness of the material, that is, of its ability to resist change of shape under stress.

However, steel has the disadvantage of being comparatively heavy, and a lighter material, such as aluminum alloy, would be a more suitable material for trolley poles except that it has a relatively low modulus of elasticity. A trolley pole made entirely of aluminum alloy and having the same cross sectional area as a steel pole, while lighter in weight, will permit too great deflection. In order to reduce the deflection of an aluminum pole, to that obtained with steel, it is necessary to increase the cross sectional area, which increases the weight and cost.

According to my invention, I provide a trolley pole having two sections of different metals which are rigidly connected together. The section which is attached to the trolley base is made of steel tubing and the section to which the trolley wheel is attached is made of aluminum-alloy tubing.

By using this construction, the weight of the portion of the trolley pole which is farthest removed from the base is decreased, thereby decreasing the moment of inertia of the pole with reference to an axis through the base.

In order to prevent deflection, steel tubing is provided at the butt of the pole where maximum strength is required. However, the weight of the steel tubing does not materially increase the moment of inertia of the pole, as the center of gravity of the steel section is a comparatively short distance from the pivotal axis of the pole.

For a fuller understanding of the nature and objects of the invention, reference may be had to the following detailed description, taken in conjunction with the accompanying drawings, in which:

Figure 1 is a view, in elevation, of a trolley pole constructed in accordance with my invention, a portion being cut away for clearness;

Fig. 2 is a cross-sectional view, taken along the line II—II of Fig. 1.

Referring to the drawings, a trolley pole 10 is shown carried by a base 11 which may be mounted on the top of an electric car or locomotive (not shown). Since the base 11 may be of any standard construction, well known in the art, it will not be described in detail in this specification.

The trolley pole 10 comprises a section of steel tubing 12, one end of which is clamped in a yoke 13. As shown in Fig. 1, the yoke 13 is pivotally mounted on the base 11 by a bolt 14. In this embodiment of the invention springs 15 are disposed on the yoke 13 to bias the pole to its operative position. As will be readily understood, the bending strains to which a trolley pole is subjected are greatest near the base and the use of a steel base section will give the pole the desired strength without giving it a great turning moment about the base on account of weight. In order to provide a light-weight pole the upper section 16 is made of a light-weight metal such as aluminum-alloy tubing. As shown, one end of the aluminum-alloy tubing is inserted in the end of the steel tubing and is secured in position by two pins 17 and 18, which are disposed at right angles to each other. A trolley wheel 19, of a standard type, is rotatably mounted in a trolley harp 20 which is attached to the outer end of the aluminum-alloy tubing. The upper section 16, being light, the center of gravity of the pole will not be far-removed from the center of gravity of the base section.

As illustrated, the sections of tubing may be of gradually decreasing cross-sectional area toward the outer end of the pole, thereby decreasing the weight of the pole.

It will be readily seen that a trolley pole of light weight will require less tension in the springs 15 to raise the pole to the operative position and to maintain the proper contact pressure between the trolley wheel and the trolley wire, than will be required by a heavy pole.

It will also be understood that a trolley pole of low inertia will permit the trolley wheel to pass over slight irregularities in the trolley wire without becoming disengaged therefrom.

Although I have described a specific embodiment of my invention, it will be apparent to those skilled in the art that various modifications may be made in the details of construction and in the design and proportion of the several cooperating parts without departing from the spirit and scope of the invention as defined in the appended claims.

I claim as my invention:

1. A trolley pole comprising, in combination, a section of steel tubing having one end adapted to be attached to a trolley base, a section of aluminum-alloy tubing disposed in alined end-to-end relation to the steel tubing, and means for securing the two sections together to make a rigid trolley pole.

2. A trolley pole comprising, in combination, a section of steel tubing having one end to be attached to a trolley base, a section of aluminum-alloy tubing having one end inserted in the end of the steel tubing opposite the end attached to the trolley base, and means for securing the two sections together to make a rigid trolley pole.

3. A trolley pole comprising, in combination, a section of steel tubing having one end to be attached to a trolley base, a section of aluminum-alloy tubing disposed in alined end-to-end relation to the steel tubing, the successive steel and aluminum alloy sections being of gradually decreasing cross-sectional area, and means for securing the two sections together to make a rigid trolley pole.

4. A trolley pole comprising, in combination, a tubular section composed of a relatively heavy metal to be attached to a trolley base, a tubular section composed of a relatively light metal disposed in alined end-to-end relation to the section of heavy metal, and means for securing the two sections together to make a rigid trolley pole having a relatively light weight and a relatively low moment of intertia with reference to an axis through the trolley base.

5. A trolley pole comprising, in combination, a tubular section composed of a relatively heavy metal having a relatively high modulus of elasticity to be attached to a trolley base, a tubular section composed of a relatively light metal having a relatively low modulus of elasticity disposed in alined end-to-end relation to the section of heavy metal, and means for securing the two sections together to make a rigid trolley pole of a relatively light weight and having a small amount of deflection and a relatively low moment of inertia with reference to an axis through the trolley base.

6. A trolley pole comprising, in combination, a base section of a metal having a high modulus of elasticity to withstand bending forces, an upper section of a light-weight metal for mounting on the base section, said upper section being located at a distance from the base of the pole where the bending forces are small, to locate the center of gravity of the pole near the base, and means for connecting the sections.

In testimony whereof, I have hereunto subscribed my name this 31st day of March, 1930.

WILLIAM SCHAAKE.